United States Patent [19]

West

[11] 4,196,542
[45] Apr. 8, 1980

[54] ORNAMENTAL TOPIARY STRUCTURE

[76] Inventor: Otho S. West, 2525 Idlewild St., Lakeland, Fla. 33801

[21] Appl. No.: 915,233

[22] Filed: Jun. 13, 1978

[51] Int. Cl.$^2$ ............................................. A01G 17/06
[52] U.S. Cl. ............................................. 47/4; 47/66; 47/70
[58] Field of Search ...................... 47/4, 33, 70, 66, 83

[56]   References Cited
  U.S. PATENT DOCUMENTS

| | | | |
|---|---|---|---|
| 1,895,282 | 1/1933 | Fisher | 47/4 |
| 1,954,424 | 4/1934 | Otwell | 47/33 |
| 2,113,523 | 4/1938 | White | 47/33 |
| 2,121,173 | 6/1938 | MacPherson | 47/33 |
| 2,219,870 | 10/1940 | Jacobus | 47/33 X |
| 2,279,735 | 4/1942 | Gates | 47/33 |
| 2,344,076 | 3/1944 | Bonfiglioli | 47/70 X |
| 3,389,499 | 6/1968 | Haile | 47/33 |
| 3,686,791 | 8/1972 | Mills | 47/83 |
| 3,935,671 | 2/1976 | Soot | 47/70 |
| 3,992,812 | 11/1976 | Horowitz | 47/33 |

FOREIGN PATENT DOCUMENTS 23296 of 1904 United Kingdom ........................ 47/33

Primary Examiner—Edgar S. Burr
Assistant Examiner—James R. Feyrer

[57] ABSTRACT

A group of topiary framing members, each carried separately by a planter or flower pot, the pots or planters slideably assembled into a group for contiguous support, one planter by the next. The exposed parts of each plant have a color distinct from an adjacent plant and are supported by a planter separable from the group for trimming to a selected shape provided by the topiary framing member, so that the assembly of topiary frames and plants thereon forms a composite design of trimmed shape, each individual plant of the assembly growing from a separate planter. The group of composite framing members are in the form of an ornamental object, such as animal or person or other, having the appearance of an ornamental single statuary composite, and the plants thereof grow as a group while their planters are separable easily for trimming of the plants, such as slideably, and are then reassembled into the ornamental composite.

14 Claims, 15 Drawing Figures

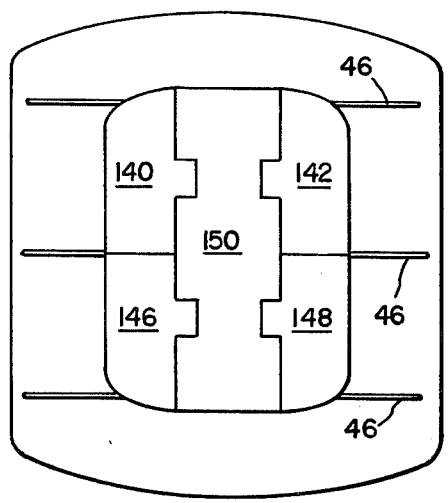
Fig. 8
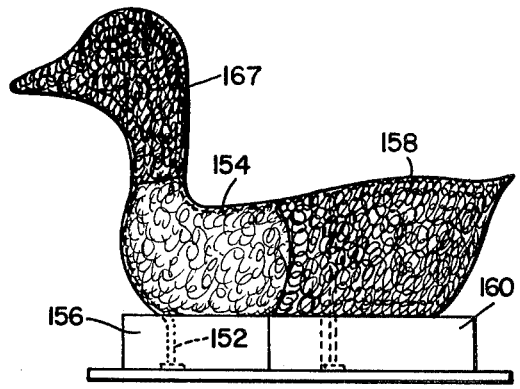
Fig. 10
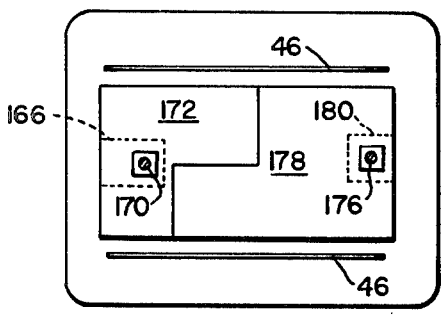
Fig. 12
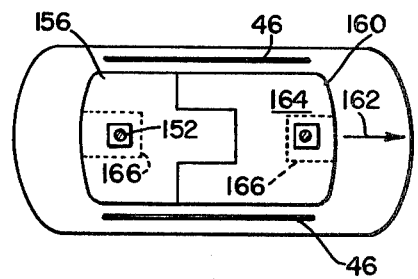
Fig. 11
Fig. 13
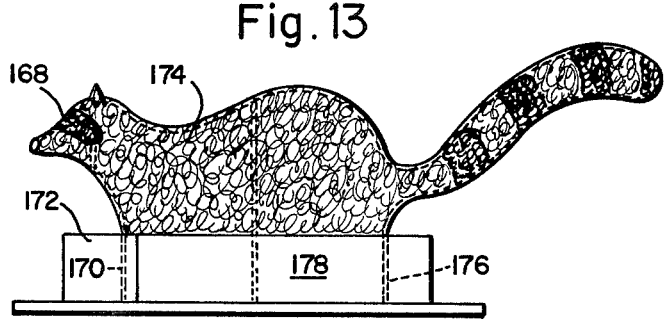
Fig. 14
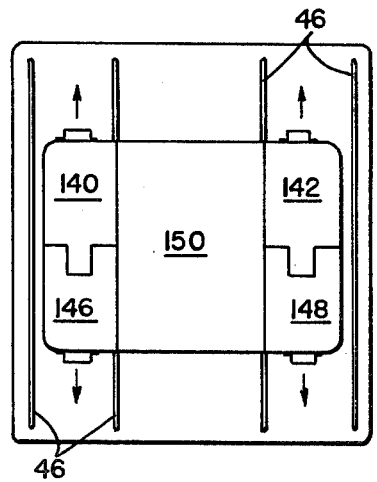
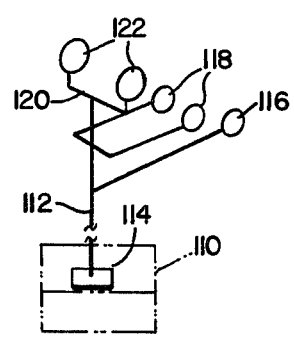
Fig. 15

ORNAMENTAL TOPIARY STRUCTURE

The invention relates to a combination of topiary frames each mounted and supported from an individual planter having a number of plants grown therein and trimmed to the topiary shape thereof, the topiary frames and plants being shaped for assembly into a composite group from which individual planters, topiaries and plants therein are easily separable for plant culture, trimming or the like, and forming in grouped assembly a composite plant-formed figure or sculpture, such as animals, persons or ornamental works of art or the like, each plant being shaped and formed of complimentary colors to provide a portion of the assembled figure.

Each plant of a single planter grows leaves or other plant parts of a distinct color effect, whereby the composite may simulate an integral sculptured structure such as one or more animals, persons, ornamental forms or shapes as a composite design. Each planter may carry a single or several plants which, by the color effect of its fruit, leaves, stems or flowers or the combination will supply a distinct color to a part or distinct area of the final assembly, whereby an individual ornamental structure such as an animal formed of contrastingly colored parts are assembled of growing plants, each part being a living plant growing from an easily separable individual planter.

More particularly, the topiary composite hereof is formed of easily separable planters or pots mountable contiguously for individual support one by the next as a group to form an integral ornamental plant structure, the topiary composite and supporting planters being easily separable into individual plants for trimming, cultivating and the like, whereby upon reassembly the original characteristic integral design simulated by the group is reconditioned and reformed.

It has been suggested in the art, typically U.S. Pat. No. 986,395 to plant flowers in garden pots or sections, as in U.S. Pat. No. 2,436,670 each of different colors or types of plants and sometimes the plot may be formed as in U.S. Pat. No. 986,395 of separable flower pots. U.S. Pat. No. 3,992,812 suggests forming a topiary framework where parts are fastened together by screws or clamps, so that the structures may be unfastened or bent apart temporarily, but an insignificant distance for trimming, and the structure cannot be used for assembly of contrastingly colored foliage cultured in a separate topiary shape to form a composite design of widely different shapes. Again, a group of flower pots with laterally extending plants are known to be assembled vertically into a wall as shown in U.S. Pat. No. 3,389,499.

According to the present invention, in contrast, separate and distinctly different plant parts, which in combination form a large integral design, are separably assembled to a single design from different plants which are easily separated a substantial distance one from the other, for easy cultivating and trimming of leaves of no significant changes of structure, thus to regenerate the original distinct appearance of each part, cutting back from several days or weeks of growth, and each plant of which then can be easily portably reassembled to its original ornamental position in the group, whereby the composite design is readily controlled according to its original design, shape and contrasting color. Moreover, the group of planters, each separably portable allow the original design to be placed ornamentally as desired within a house or upon a lawn as close to or as far from other shrubbery as desired. Thus each figure composited from variously colored plants are useful above as an ornamental figure or can be grouped as scenery formed of carefully trimmed plant shapes.

The several pots or planters are preferably placed upon a supporting tray as a water supply or drainage tray, the tray preferably being large enough to slideably support individual planters as needed for The composite design, whereby they may be pushed together for mutual support from the elements such as wind, snow or ice, and for exact alignment of each topiary and plant, and then slided apart for trimming. Moreover, each section of the topiary framework may be filled with a plant supporting medium, such as dry peat or moss or filler at selected heights within the framework from which portions of the plant may root or grasp by vine tendrils both for plant growth or for plant support.

The invention is further described in relation to the drawings wherein.

Figure 6:
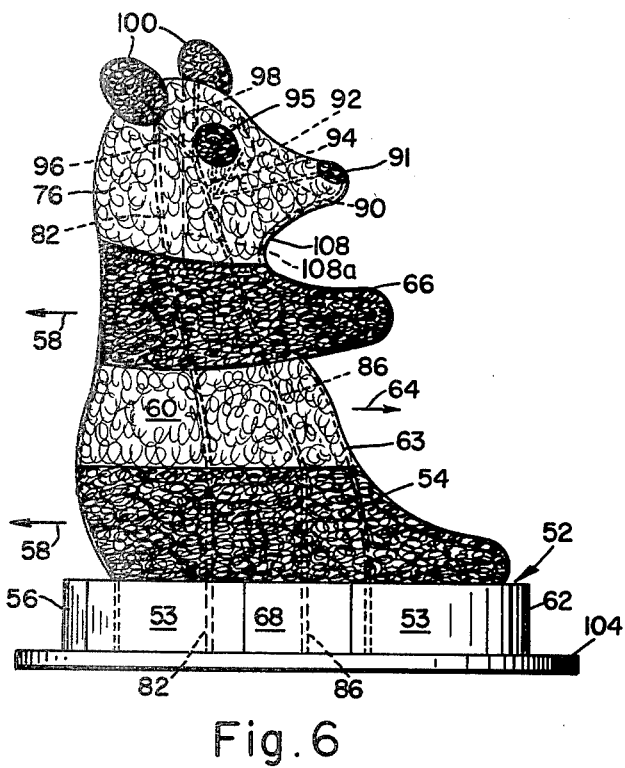
FIG. 6 is an assembly of plants simulating a panda bear, each assembled plant section being of a contrasting color to its neighbor.
Figure 7:
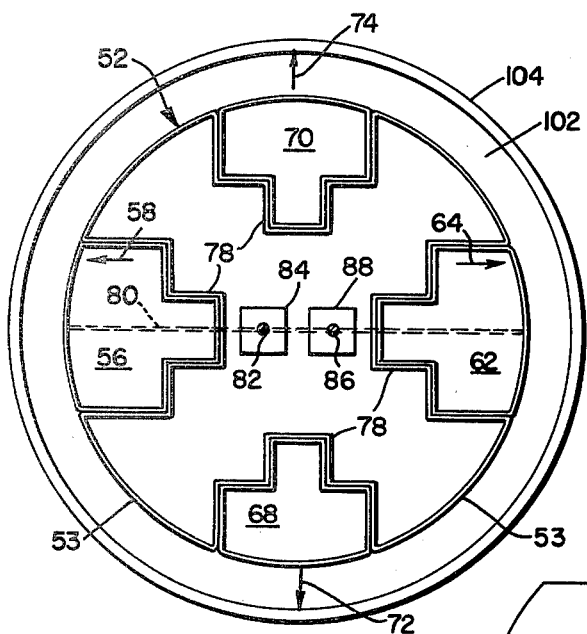

And FIG. 7 illustrates in detail an upper plan view of the several assembled pots for growing and supporting the panda of FIG. 6.

Figure 4:
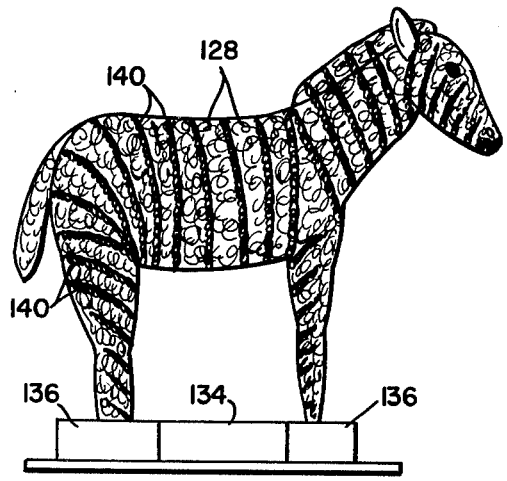
FIG. 4 is an assembly of plants shaped to simulate a zebra in which the body of the animal is of one group of plants of one dark color, typically green, and the stripes are each separately grown of a contrasting light color.
Figure 9:
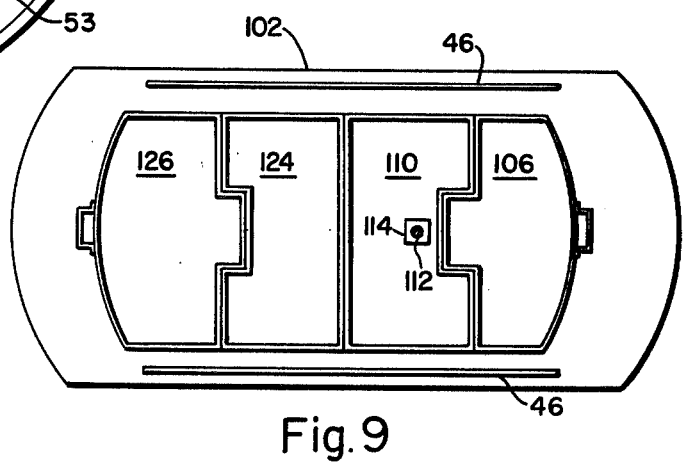

FIG. 8 shows an alternate pot arrangement for supporting the zebra of FIG. 4;

FIG. 9 shows an alternate pot arrangement for supporting the panda of FIG. 6;

FIG. 10 shows an assembly of plants simulating a duck;

FIG. 11 shows a plan view of the pot arrangement for supporting such duck;

FIG. 12 shows an alternate pot arrangement for support of said duck;

FIG. 13 shows an assembly of plants simulating a raccoon;

FIG. 14 shows a pot arrangement in plan view for supporting the raccoon of FIG. 13.

FIG. 15 shows an alternate arrangement for mounting of eyes, nose and ears of the panda.

Figures 1, 2, 3:
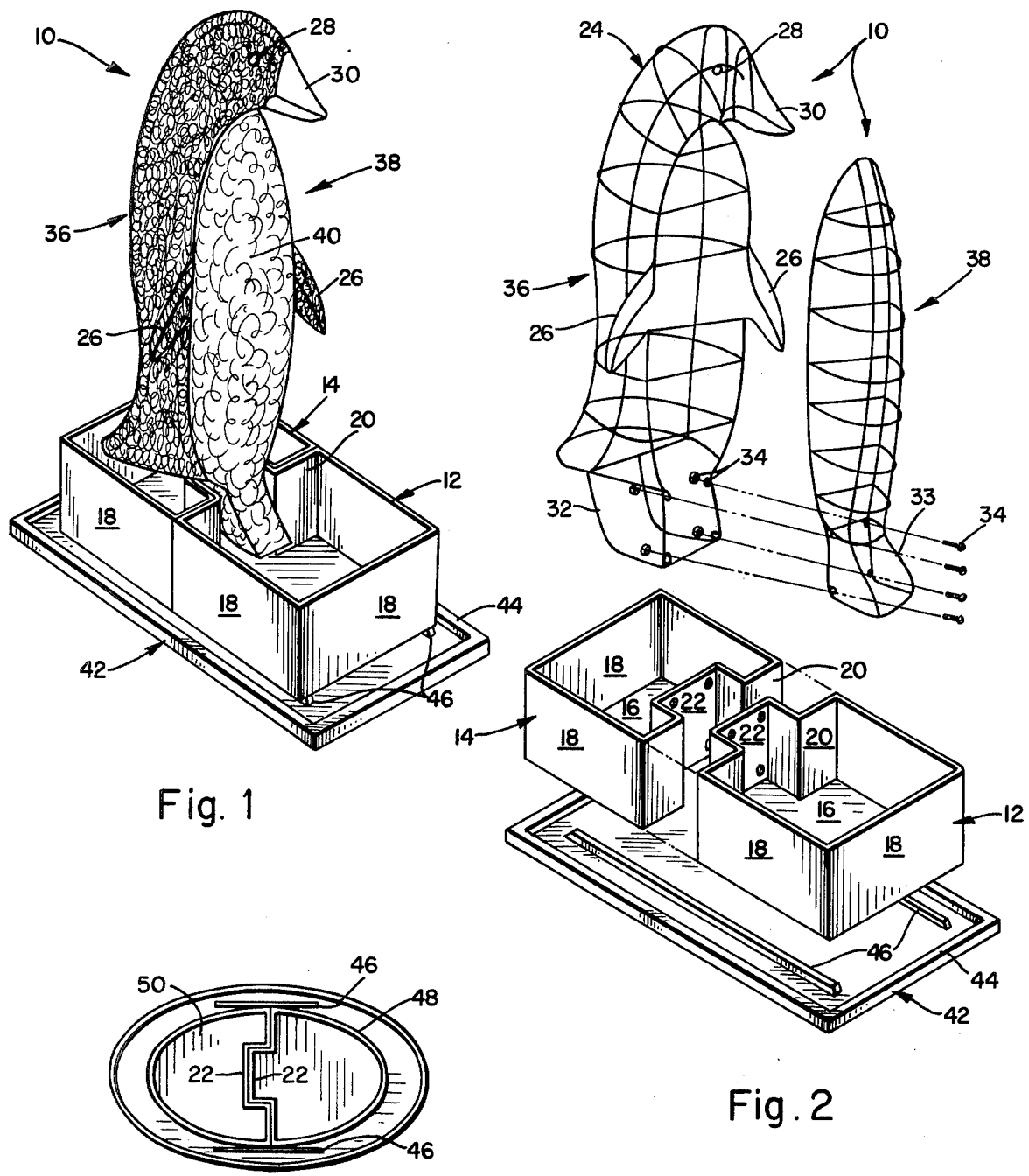
FIG. 1 shows an assembly of flower pots, a group of which will grow plants simulating a penguin of contrastingly colored body portions.
FIG. 2 is a similar view having the separate pots, framework topiaries and supporting base shown in separate disassembled detail.
FIG. 3 is a plan view of an alternate shape of paired planters and supporting tray in plan view.

Referring to FIGS. 1 and 2 the composite is intended as supporting planters and framework, in which are grown separable plants, each to form in combination in ultimate assembly a composite plant simulating a penguin 10.

A pair of planters 12 and 14 are formed, each having a bottom 16 with an enclosing set of end and side walls 18. The adjacent walls 20 of each planter have an off-set portion 22 so that the planters 12 and 14 may interfit or mate with their off-set contiguous wall portions 22 interfitting for vertical support of the assembled plants as shown in FIG. 1. The bottoms 16 of each planter 12 and 14 may be perforated for water drainage or inlet (not shown).

A topiary frame 24 formed of interconnected heavy guage wire or welded rods, as shown in FIG. 2, each frame simulating a single colored plant support portion and shaped as a topiary upon which to grow the correct shape of the portion of the penguin body. The larger topiary body is formed having arms 26, eyes 28 and a beak 30. The lower part of the frame 32 supports bolt and nut type fastening elements 34 through which the total framework 24 may be fastened to a planter wall 22, the lower shape being sized to fit within the planter 14, and shaped to lie adjacent to the walls thereof for additional contact vertical support, merely by the lower framework fitting against the walls thereof preferably as shown diagrammatically in FIG. 2.

While the eyes 28 or the beak 30 may be supported for specific plant growth shaped to simulate these organs, as suggested in other figures described below, they may be inanimate marble or colored stones fastened to the framework in a position to simulate the eyes. The beak may be a sheet of colored metal foil mounted over supporting framework to simulate inanimately the beak of the penguin.

The entire framework 24 may be stuffed tightly with dried sphagnum moss and the total stuffed framework is bolted to the wall 22 of the planter 14, which is further packed and filled with moss or potting soil to support the plant culture grown therein. The plant thus is a culture of green (or other selected color of) leafing vines or shrubs, which, after culture and trimming back to the shape established by the topiary 24 will appear as a larger shaped body portion of the penguin 36, as shown in FIG. 1.

In a similar manner the topiary frame portion 38 of FIG. 2 is shaped to simulate the front breast portion of the penguin and it will comprise a smaller framework of wire or rods as shown, the lower portion 33 thereof being fastened similarly by bolting by bolts 34 against the wall 22 thereof within the planter 12. Similarly the framework is stuffed with dried sphagnum moss or any plant culture or supporting material, the lower portion of the planter 12 being filled with potting soil and a plant will be grown on the topiary frame and within the planter to grow and be entrained about the topiary 38 to correspond to the breast portion of the penguin. The plants grown about both frame portions will be of contrasting color, for instance, the body portion 36, as shown in FIG. 1 may be any green leafing plant, typically Virginia Creeper, English Ivy or a small Boxwood, trimmed to the shape 36 shown, and the breast portion may have grown a contrastingly light colored plant. For instance, a species of vicus repens, commonly known as variagated vicus repens, may be selected to give a white or silvery appearing leaf for the culture which may be similarly trimmed back carefully to grow upon and adopt the shape 38, and the assembled culture as shown in FIG. 1 will appear white, as the white breast portion of the penguin in contrast to the green or back portion of its body 36. Other light colored vines or shrubs as varigated pyracantha, or pittisporum may be selected and the green or dark portion may be of another wider selection of green or other colored plants available.

For assembling to the penguin shape, the planters 12 and 14 are slided together with the inner wall portions 22 interfitted as shown, whereby the two plants are supported with the breast portion 40 lying contiguous to the back and in proper position in attractive color contrast to simulate the assembled penguin as shown in FIG. 1.

The assembled planters 12 and 14 of FIG. 1 may be mounted in a supporting tray 42 which may have an outer confining flange 44 to contain and catch any water added to or dripping from the plants, whereby the tray may be located in doors or out doors with a confined water supply for the culture assembly.

Guide rails 46 are preferably mounted beside each planter 12 and 14 whereby to guide the movement of the planters in spaced apart positions for trimming and cutting of the plants as they grow, cutting the foliage back from time to time to better approximate the original penguin design, and then to slide the planters back to their assembled positions with the benefit that the guide rail 46 guides the two planters into the exact interfitting planter positions necessary to assemble the plant into the composite needed.

The use of rail guides and the movability of the planters further allows cleaning of the tray, removing or replacing the water, pruning of roots and inspecting for plant infections or drainage and exact return to combined positions.

Moreover, the guide rail prevents the combined plants from separating by the effect of weather elements, wind, ice, snow, rain or the like, maintaining the composite planters in their selected and fixed design position needed to simulate the original penguin.

As shown in FIG. 3 the planters may be shaped as desired, themselves oramental. For instance, instead of the rectangular shape of FIGS. 1 and 2, they may be rounded to an ovate or other selected shape, still useful as a planter of selected attractive design, complementing the ornamental form of the plant itself. For instance, the rectangular shaped planter 12 of FIGS. 1 and 2 may become a semi-ovate shape 48, and the rectangular shape 14 may become a complementary and semi-ovate shape 50, still interfitted by the locking wall 22 for positioning of the planters, and still desirably guided together as a composite or separated for trimming by the guide rails 46. The other shapes of pots described below for other figures, particularly the two part pots of FIGS. 11 and 12 may also be used for the penguin. Where the planters are large and heavy they may each or some of them be mounted on wheels or castors for improved movability (not shown).

Figure 5:
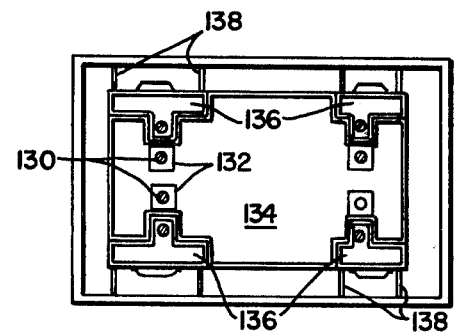
FIG. 5 is a plan view of the assembly of planters used to grow the composite zebra animal figure of FIG. 4.

The same principle may be followed for designing slideably separable topiary structures or numerous other ornamental objects, preferably animals. For instance, as shown in FIG. 6, a panda formed of various colored plants is mounted with most of its central bulk supported from a relatively stationary planter 52. It is shown here as being circular and supported by side walls of that shape 53, further shown in plan in FIG. 7. However, in a modified interfitting form for assembly, it could be rectangular, as shown in FIGS. 5, 9 and 14, which would also be useful for other animals as will appear below.

The lower portion of the panda 54 will have a lower framework filled into the stationary pot area 52, and may remain relatively immovable with that central portion 52 of the pot, and when other interfitting pot portions are moved away, the lower central portion of the panda will remain supported therefrom for easy trimming. The back portion has stripes through the center and will be mounted in a movable pot 56 in which will be fixed a supporting topiary frame (not shown), supporting the back stripes of the panda bear, so that the back will be movable to the rear with the pot 56 as a back stripe portion of the plant in the direction of the arrows 58. The front portion of the panda 63 and annular sides connecting thereto 60 are suppoted upon a topiary frame fitted into a planter or pot 62 with the topiary frame fastened therein in the manner described for the penguin of FIGS. 1 and 2. Such frontal topiary frame will similarly carry a contrastingly colored plant, such as having white or silvery leaves, so that the white front portion 63 of the panda, similar to the white front described for the penguin 38 of FIG. 2, but having side portions 60 integral therewith, are free to slide forward in the direction of the arrows 64 together with the pot 62 separating the front portion and sides thereby from the body of the panda for easy trimming.

Again, the side paws 66 are grown in part from sphagnum or other porous earthy plant supporting medium, carried from topiary framework passing through the hollow center of the stationary panda body will each be supported on opposite sides by slideable pots 68 and 70, each for a paw 66, the pots 68 and 70 being respectively movable in the direction of the arrows 72 and 74. Thus, the paws 66 will be separable from the body of the panda by movement in opposite side direction a sufficient distance of several inches, there being that much clearance within the hollow center of the panda (not shown), to allow separation by that movement of each paw for easy trimming. Such paws may be typically colored with green or other contrasting color. The head portion 76 may be mounted upon a topiary framework upon rods (not shown) fastened to the inner wall sides of partitioning elements 78 in the stationary pot 52. If the head is desirably moved it can be built in two halves and the pot 56 may be divided, one to support each separably along the dotted line walls 80.

Moreover, other special striped or spotted portions, comprising a small topiary piece, such as a patch or ball may be stuffed with moss and mounted on a rod 82 in a fixed box 84 and bent to apear as a patch, supported by the rod 82 in a stationary manner, for instance simulating a stripe on the back of the panda from which surrounding plant material supported in the planter 56 will be moved away for trimming of both plant portions of contrasting color.

Again, another rod 86 will be mounted in a stationary support box 88 from the center of the planter and the rod 86 shown in dotted line position of FIG. 6 will have branch rods in the head 90 to support the tip of the nose 91, rods 92 and 94 to support a pair of eyes 95, the rods 96 and 98 to support ears 100. The eyes, nose and ears can, as pointed out for stripes and patches, be formed of growing plants, growing from a ball of dried moss or other plant supporting medium, retained within a small topiary frame in a stationary manner for simulating each of these body elements. These body parts alternately may be completely inanimate and supplied as a piece of fur or metal foil, or of colored plastic simulating shaped as such body elements and formed of inanimate weather resistant material.

The entire assembly of planters are circular, as shown in FIG. 5 in assembled position and are mounted concentrically within a tray 102, which has an annular flange 104 around its periphery for retaining water in ordinary use. Each of the planters may be slided radially outward from the stationary center for trimming, and merely slided back to assembled position of FIGS. 6 and 7 after trimming and restoring the composite plants to the original design and shape. Thus the panda is maintained as a growing plant with occasional trimming as needed.

In an alternate separating structure, the supporting pots or planters may be arranged as shown in FIG. 9. In a forward planter 106, the front end of the panda is supported as in FIGS. 1, 2 and 6 on a topiary frame extending from that planter separable from the remainder of the panda, and in addition, the forward portions 63 of the panda, as shown in FIG. 6 and a forward half of the head portion 108, as shown in dotted line separation of FIG. 6 will be supported therein along a vertical separating plane portion 108a, for forward sliding movement for separation as part of the topiary with movement of planter 106 so that the entire front and forward end of the head are grown as this forward topiary of a single color, such as by a white or silvery leafed plant.

In place of the eyes 95 and nose 91, as shown in the diagram of FIG. 15 a pair of cylindrical tubes are supported by welding to the framework. A second planter 110 mounted adjacent to the forward planter 106 carries a rod 112 suppurted in a pot 114. A rod 112 rises vertically and supports at the appropriate level another cylindrical tube 116 in which is planted a nose portion of dark colored leaves at the level of the nose. At a still higher level on the rod 112 are a pair of cylindrical tubes 118 and these correspond to eyes and the plants in tubes 118 will be correspondingly dark.

At the top of the rod 112 is a cross rod 120 which supports at each end two bulbular plants positioned and shaped to simulate the ears. The forward end of the panda thus may be slided horizontally toward and away from the planter 110 to position or to separate the group of plants, simulating eyes, nose and ears being slideably grown in tubular supports to slide within the forward head portion into and out of position to simulate these features of the panda. Again, in assembled position the two ear portions 122 will be supported on the rods 112 and 120 in proper position for the ears. With that support both the planters 106 and 110 may be slided apart from each other for trimming and then back together again, as guided by the rails 46 for positioning in the assembled plant either for separating or for trimming.

The third planter 124 carries a topiary for support of the rear head portion 76 of the panda as divided along plane 108a, as well as the light center chest portion 60 of the panda positioned at the appropriate height of the topiary.

An after planter 126 supports the lower paws 54 shaped in horseshoe fashion to lie with both paws extending forward as shown in FIG. 6, and is supported by a topiary. An upper portion of the topiary 66, also in horseshoe shape extends as paws forwarded of the first portion and carries a dark ring of plant at an appropriate height as shown in FIG. 4. In this alternate structure, the panda is supported in a group of planters, each nested for mutual support, each slideable horizontally forward and to the rear from each other, according to the assembly of FIG. 9, and thus in assembled position defines the same panda of FIG. 6.

As shown in FIG. 4 a zebra too may be assembled alternately supported with the main body 128 supported from rods 130, confined within boxes 132, the main dark body of the zebra being supported at four corners of a usually stationary planter 134. The striped portions are grown upon four movable topiaries, each supported within a planter 136 slideable laterally upon guide rails 138. The planters 136 support topiaries shaped as stripes 140, each planter 136 supporting a corresponding and complementary group of stripes, according to its disposition at a corner of the zebra, so that four separate groups of stripes may be supported against the dark colored plants of the zebra's body and each is readily separated as a group of striped shaped planters. Each set of stripes may be carefully trimmed for such simulation in separated position and returned to the assembly as light stripes against a green background, against a trimmed green body, the composite being an attractive easily recognized zebra and so maintained by trimming as needed. For this purpose the assembly as shown in FIG. 4 of the zebra 128, having stripes 140 thereon and the supporting slideable assembly of planters are arranged as shown in FIG. 5.

The zebra could also be supported in planters, as shown in FIGS. 8 or 14, for which purpose one pot would be supported in a respective planter quadrant 142, 140, 146 or 148 thus to separate the stripes in that area upon a topiary, for cutting and trimming, moving each planter away from center portion 150, which supports the dark foilage grown main body of the zebra, separating and returning for trimming and reassembly of the zebra, according to the topiary forms, as shown in FIG. 8. Similarly, thezebra corners simulating the stripes could be moved vertically as in FIG. 14, separable by sliding with the help of guide rails 46 in each case, either horizontally or vertically, according to the tray used in each of these figures.

As shown in FIG. 10, a wild duck may be simulated by contrastingly colored topiaries, a dark head and beak grown upon a topiary supported upon a rod 152 with the main body of light contrasting color 154 supported within a forward planter 156. The rear of the duck 158 of dark colored plants is supported within an after planter 160 which, as guided by rails 46 may be moved to the rear as by arrows 162 for trimming. The forward rod 152 supporting the dark head is disposed within an open groove portion 166 so that the planter 156 may be slided sufficient to the rear in the direction of the arrow 162, to allow the head portion 167 to be separated for trimming, the rear planter 164 sliding within the grooved cut-away area 166, sufficient to allow enough separation of the duck body for trimming of both. While the duck is preferably mounted in an assembly as shown in FIG. 11, it alternately may be mounted as shown in the planter arrangement shown in FIG. 12.

As shown in FIG. 13, the topiary structure may also be shaped to simulate a raccoon which may also have a supporting base, as shown in FIGS. 8, 11, 12, or 14, in which different colored plants may be assembled from each quarter as in FIGS. 8 and 14, or disposed in a simpler structure support using two separable planters as in FIGS. 11 and 12. For each purpose specific colored plant simulated portions of the raccoon, for instance having a patch over the eyes 168, which may be suppoted upon a separate rod 170 in the forward planter 172 separable from a light colored plant portion 174 by a groove 166 in which the supporting rod may slide as shown in FIG. 11. In the same manner a series of rings in alternate colors may be supported above a tail simulating structure on the rod 176 at the rear of the planter portion 178, slideable within a grooved area 180 of the planter 178, whereby, by sliding forward or to the rear for assembly or disassembly of the group, within rails 46, the several parts of the assembled topiary may be separated for trimming.

As thus described the separate planters may be mounted slideably with guide rails for assembly and mutual side support of one planter against the next, both for guided assembly, for separated trimming and cultivating, as well as deriving much support against the elements, each planter supporting a topiary frame in which a portion of a plant of selected color is fixed and grown at a selected height for artistic supply of selected color and trim, each forming a part of the artistic design of an animal or other object of artistic interest. The plants are assembled as a jigsaw puzzle, each part or element with a distinct color and is separable with its planter to be carefully trimmed from time to time to a separated topiary shape each to its separate portion of the plant, for trimming and supply of appropriate shape and color at the selected area of the total design.

Various planters are provided as useful for separating selected portions of the assembly, in that many fit into the assembly some of which may be supported well above the planter level upon rods as needed, so that some of the topiaries may be supported for plant growth in selected color at the appropriate position, according to the overall design needs. For that purpose the elevated plant portion may be derived by long vines extending upward of the planter, or the topiary itself may be stuffed with a plant growth supporting medium from which all or some portions of the plants grow, and often both, so that the culture may be both from the level of the planter as well as at raised portions of the topiary, both carrying a plant growth supporting medium in a selected portion of the topiary as needed. Other minor artistic elements or parts simulating elements of the animal needed for completion of the design, either as plant growth or as inert attractive elements simulating the portion needed to complete the overall design, may be included.

The entire assembly may be mounted upon wheels so that each planter portion is readily movable manually; and with guide rails for accurate guided movement of the heavy planters into and away from assembled position. The assembly is mounted on a platform or tray which may have a surrounding flange for retaining water, so that the overall design may be placed upon a lawn or in-doors of improved utility for having such portability.

Other modifications as may occur to one skilled in the art are intended to be within the scope of the terms of the claims.

I claim:

1. An assembly of topiary frames, some of which are curved and form in combined form a support for a unitary floral assemblage, each frame separately supported by a planter separable from the adjacent planter, said assembly being operable with a plant culturing medium in which plants will grow entrained upon the topiary frames in each planter, each frame being distinct from an adjacent frame and shaped to approximate a complementary portion of said assemblage, each planter having at least one wall having defined therein at least one wall portion which interfits with a corresponding wall portion of an adjacent planter in a complimentary manner to provide continuity and support for each member of the group of planters, whereby the planters may be separably grouped in neighboring wall contact with each other and orient each of the topiary frames into a composite form, the assembled group of planters and topiary frames forming a composite floral assemblage of said topiary frames and adapted to support plants thereon and shaped to said frames as a recognizable composite figure formed of the assembled plants in the group.

2. The combination as defined in claim 1, wherein the complementary shaped side wall portion of each planter provides lateral support, one to the next adjacent planter having a similar and complementary shaped wall, said planters being slideably mounted for easy assembly and separation into separate topiary frame and plant portions grown thereon as a support.

3. The combination as defined in claim 1, wherein the assembly is mounted upon a tray serving as a guide upon which the several planters may be slidingly moved for separation for trimming and reassembly into a composite design of plants.

4. The combination as defined in claim 3, wherein each tray has a peripheral flange for retaining a layer of water for moistening and drainage from the lower ends of said planters.

5. The combination as defined in claim 3, wherein each tray has mounted thereon guiding walls near at least one of the movable planters, serving to guide said planter into and away from its aligned position of assembly with the group of planters for completion of the ornamental composite, and guided separation from the group for trimming.

6. The combination as defined in claim 1 wherein the assembly of planters and topiary frames therein, are slideably mounted upon a tray, the assembly being an annular group with single planter elements of the group slideably movable radially for alternately assembling and separating individual planters from the group for trimming.

7. The combination as defined in claim 6, wherein the adjacent wall portions of the assembled planters are contiguous in assembled position for mutual support, the assembly of planters and topiary frames therein being slideably mounted upon a tray, said assembly being arranged in a rectangular group with individual planters having walls shaped to interfit in assembled form and being slideable away one from another in longitudinal movement from the group for trimming.

8. The combination as defined in claim 1 wherein members of the assembly of planters and topiary frames therein are slideably mounted upon a tray, the assembly being arranged in a rectangular group comprising a main planter portion disposed relatively stationary upon said tray and having corner portions slideably movable away from said relatively stationary main portion for trimming.

9. The combination as defined in claim 1 wherein members of the assembly of planters and topiary frames therein are slideably mounted upon a tray, the assembly being an annular group comprising a main relatively stationary planter element having peripheral wall portions interfitted with several slideable planter elements, each movable radially away from and toward said stationary planter element for trimming and reassembly therewith.

10. The combination as defined in claim 1 wherein the assembly of topiary frames and separable planters supporting said frames adapted to carry plant and foliage growing therein and supported upon the topiary frames to bear the configuration of a selected animal naturally having different contrasting colored portions, and the plants of said separable topiaries and planters provide colored areas in assembled position and are shaped with the contrasting colored areas simulating the selected animal, whereby to slideably separate said planters, topiaries and plants therein for trimming each plant of distinct color and shape, and for slideable reassembly into the selected composite animal configuration.

11. The assembly as defined in claim 10, wherein the simulated shape is a penguin.

12. The assembly as defined in claim 10, wherein the simulated shape is a panda.

13. The assembly as defined in claim 10, wherein the simulated shape is a raccoon.

14. The assembly as defined in claim 10, wherein the simulated shape is a duck.

* * * * *